US010053562B2

(12) United States Patent
Tanaka et al.

(10) Patent No.: US 10,053,562 B2
(45) Date of Patent: Aug. 21, 2018

(54) RESIN COMPOSITION, TONER FOR ELECTROPHOTOGRAPHY AND HOT MELT COMPOSITION

(71) Applicant: MITSUI CHEMICALS, INC., Tokyo (JP)

(72) Inventors: Masakazu Tanaka, Yokohama (JP); Kuniaki Kawabe, Chiba (JP); Hirotaka Kanaya, Chiba (JP); Keiichi Taki, Tokyo (JP); Yuichi Kaida, Yamaguchi (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/303,970

(22) PCT Filed: Apr. 17, 2015

(86) PCT No.: PCT/JP2015/002129
§ 371 (c)(1),
(2) Date: Oct. 13, 2016

(87) PCT Pub. No.: WO2015/159556
PCT Pub. Date: Oct. 22, 2015

(65) Prior Publication Data
US 2017/0037227 A1 Feb. 9, 2017

(30) Foreign Application Priority Data

Apr. 18, 2014 (JP) .................... 2014-086656

(51) Int. Cl.
C08L 23/00 (2006.01)
C08L 23/04 (2006.01)
C08L 101/00 (2006.01)
G03G 9/08 (2006.01)
G03G 9/087 (2006.01)
C09J 11/08 (2006.01)
C09J 123/08 (2006.01)

(52) U.S. Cl.
CPC ............ *C08L 23/04* (2013.01); *C08L 101/00* (2013.01); *C09J 11/08* (2013.01); *C09J 123/0853* (2013.01); *G03G 9/08* (2013.01); *G03G 9/087* (2013.01); *G03G 9/08711* (2013.01)

(58) Field of Classification Search
None
See application file for complete search history.

(56) References Cited

U.S. PATENT DOCUMENTS

| 3,911,191 A * | 10/1975 | Guastella ............ B05D 1/26 427/179 |
| 6,268,099 B1 | 7/2001 | Eguchi et al. |
| 2002/0022189 A1 | 2/2002 | Kawanishi et al. |
| 2003/0171481 A1 | 9/2003 | Toyoda |
| 2006/0014901 A1* | 1/2006 | Hassan ............ C09J 123/0815 525/191 |
| 2007/0060669 A1 | 3/2007 | Yoda et al. |
| 2008/0306217 A1 | 12/2008 | Karjala et al. |

FOREIGN PATENT DOCUMENTS

| EP | 1 788 453 | 5/2007 |
| JP | S61-236804 A | 10/1986 |
| JP | H08-114942 A | 5/1996 |
| JP | H08-239414 A | 9/1996 |
| JP | H08-248671 A | 9/1996 |
| JP | 09-319142 | 12/1997 |
| JP | 2992918 | 12/1999 |
| JP | 2000-338717 A | 12/2000 |
| JP | 2003-183453 A | 7/2003 |
| JP | 2003-201436 A | 7/2003 |
| JP | 2004-025487 A | 1/2004 |
| JP | 2005-024933 A | 1/2005 |
| JP | 2005-105049 A | 4/2005 |
| JP | 2005-343920 A | 12/2005 |
| JP | 2009-522401 A | 6/2009 |
| WO | WO-2007/114102 A1 | 10/2007 |

OTHER PUBLICATIONS

Partial Supplementary European Search Report Issued in EP Patent Application No. 15779360.5 dated Oct. 24, 2017.
International Search Report issued in International Patent Application No. PCT/JP2015/002129 dated Jun. 16, 2015.
Annex Table of Comparison of references cited in the statement of application JP2016-513650.
Information Statement submitted May 21, 2018 in corresponding application JP2016-513650.

* cited by examiner

*Primary Examiner* — Ana Lucrecia Woodward
(74) *Attorney, Agent, or Firm* — Foley & Lardner LLP

(57) ABSTRACT

Provided is a resin composition which contains (A) a polyethylene wax satisfying the requirements (i)-(iv) described below and (B) at least one resin selected from the group consisting of thermoplastic resins and thermosetting resins, wherein the mass ratio of (A) to (B) is from 0.1/99.9 to 50/50. This resin composition is useful for providing a toner which can be fixed by means of a relatively-low-temperature heating body and has good offset resistance, and which is suppressed in increase of particle diameters even if the toner is stored for a long period of time. (i) The weight average molecular weight (Mw) is within the range from 400 to 1,500. (ii) The molecular weight distribution (Mw/Mn) is within the range from 1.2 to 2.5. (iii) The penetration as measured at 25° C. is 5 dmm or less. (iv) The melting point (Tm) is within the range from 50° C. to 110° C.

7 Claims, No Drawings

RESIN COMPOSITION, TONER FOR ELECTROPHOTOGRAPHY AND HOT MELT COMPOSITION

TECHNICAL FIELD

The present invention relates to a resin composition, an electrophotographic toner and a hot melt composition.

BACKGROUND ART

Polyethylene waxes are compositions used in a wide range of application fields such as electrophotographic toners, and hot melt compositions for hot melt adhesives.

A polyethylene wax is used in combination with a variety of resins. For example, a polyethylene wax can be combined with a toner binder resin for use in an image forming toner. A polyethylene wax can be blended with a resin imparting desired properties thereto for use as a hot melt composition for a hot melt adhesive.

It is known that when a resin composition containing a non-polar wax, such as a low-molecular weight polyethylene wax or a low-molecular weight polypropylene wax, is used for a toner, occurrence of offsetting becomes less, i.e., so-called offset resistance becomes improved (PTLs 1 and 2).

Offsetting is an undesired transfer of toner to an image section which occurs as follows. When a toner transferred to paper from an image developed on a photoreceptor or a toner adhered directly onto paper having a photosensitive layer formed thereon is brought into contact with a heating element for the fixation of the toner, part of the toner adheres to the surface of the heating element and the adhered toner is transferred to the subsequent image section. It is considered that addition of a non-polar wax (such as a low-molecular weight polyethylene wax or a low-molecular weight polypropylene wax) to a toner imparts releasability from a heating element and this results in decrease of the occurrence of offsetting.

CITATION LIST

Patent Literature

PTL 1
Japanese Patent Application Laid-Open No. 8-248671
PTL 2
Japanese Patent Application Laid-Open No. 8-114942

SUMMARY OF INVENTION

Technical Problem

Contrary to the above, necessity of the following improvements of the above toner have come into light through the studies of the present inventors: easier fixation by a heating element at a relatively low-temperature (about 130° C.) (low-temperature fixability), and lower occurrence of toner blocking (increase in particle diameter) caused by stickiness appearing during storage of the toner (storage property). As for the blocking, occurrence of wax blocking at the time of heat-curing causes an increase in the particle diameter of the toner and may lead to reduction of handleability.

An object of the present invention is to provide a resin composition advantageous for providing a toner which is easily fixed by a heating element at a relatively low-temperature and exhibits excellent offset resistance, and which suffers only a small increase in particle diameter during long term storage of the toner.

Solution to Problem

The inventors conducted extensive studies to achieve the above object. The inventors have found that the above-object can be achieved by using a resin composition which contains a polyethylene wax satisfying specific requirements, and completed the invention.

The present invention relates to a resin composition as set forth below.

[1] A resin composition containing: a polyethylene wax (A) which satisfies requirements (i) to (iv) below:
(i) a weight average molecular weight (Mw) of 400 to 1,500 as measured by GPC,
(ii) a molecular weight distribution (Mw/Mn) of 1.2 to 2.5 as measured by GPC,
(iii) a penetration index of 5 dmm or less as measured in accordance with JIS K 2207 at 25° C., and
(iv) a melting point (Tm) of 50 to 110° C. as measured by differential scanning calorimetry (DSC); and
at least one resin (B) selected from the group consisting of a thermoplastic resin and a thermosetting resin, wherein a mass ratio of (A) to (B) ((A)/(B)) is 0.1/99.9 to 50/50.

[2] The resin composition according to [1], wherein the polyethylene wax (A) further satisfies requirement (v) below:
(v) a fraction of a heat of fusion ($\Delta H_{-50}$) derived from a peak at 50° C. or lower, relative to total heat of fusion ($\Delta H_{all}$) derived from all peaks, being 1.0% to 5.0% as measured by differential scanning calorimetry (DSC).

[3] The resin composition according to [1] or [2], wherein the polyethylene wax (A) further satisfies requirement (vi) below:
(vi) a number of melting peaks of 2 or more as measured by differential scanning calorimetry (DSC).

[4] The resin composition according to any one of [1] to [3], wherein the polyethylene wax (A) further satisfies requirement (vii) below:

$$B \leq 0.15 \times K \qquad \text{(vii)}$$

where B is a content (mass %) of components having a molecular weight of 5,000 or more in the polyethylene wax (A), the molecular weight being in terms of polyethylene as measured by gel permeation chromatography, and K is a melt viscosity (mPa·s) of the polyethylene wax (A) at 140° C.

[5] The resin composition according to any one of [1] to [4], wherein the resin (B) is a thermoplastic resin.

[6] The resin composition according to any one of [1] to [5], wherein the resin (B) is at least one resin selected from the group consisting of a polyester resin and a styrene-based polymer.

The present invention also relates to a toner as set forth below.

[7] An electrophotographic toner containing the resin composition according to any one of [1] to [6], and a colorant.

The present invention also relates to a hot melt composition as set forth below.

[8] A hot melt composition containing 100 parts by mass of the resin composition according to any one of [1] to [5], and 5 to 300 parts by mass of a tackifier.

Advantageous Effects of Invention

The present invention can provide a resin composition advantageous for providing a toner which can be fixed with a relatively low-temperature heating element, which has excellent offset resistance, and which suffers only a small increase in particle diameter during long time storage thereof.

DESCRIPTION OF EMBODIMENTS

The resin composition according to an embodiment of the present invention contains a polyethylene wax (A) which satisfies requirements (i) to (iv) below:

(i) a weight average molecular weight (Mw) of 400 to 1,500 as measured by GPC, (ii) a molecular weight distribution (Mw/Mn) of 1.2 to 2.5 as measured by GPC, (iii) a penetration index of 5 dmm or less as measured in accordance with JIS K 2207 at 25° C., and (iv) a melting point (Tm) of 50 to 110° C. as measured by differential scanning calorimetry (DSC); and at least one resin (B) selected from the group consisting of a thermoplastic resin and a thermosetting resin, wherein a mass ratio of (A) to (B) ((A)/(B)) is 0.1/99.9 to 50/50.

In the resin composition of the present invention, the mass ratio of (A) to (B) ((A)/(B)) is 0.1/99.9 to 50/50, preferably 1/99 to 50/50, more preferably 2/98 to 30/70, and still more preferably 8/92 to 25/75. When the mass ratio is 0.1/99.9 to 50/50, it becomes easy for the resin composition of the present invention to simultaneously exhibit excellent handleability and low deformation start temperature at the time of heating.

When the resin composition of the present invention is used for a toner, the mass ratio of the polyethylene wax (A) and the resin (B) ((A)/(B)) is preferably 0.1/99.9 to 30/70. Regarding the lower limit for the polyethylene wax (A), the mass ratio of the polyethylene wax (A) and the resin (B) ((A)/(B)) is more preferably 0.5/99.5, still more preferably 1.0/99.0, particularly preferably 1.5/98.5, and most preferably 2.0/98.0. Regarding the upper limit for the polyethylene wax (A), the mass ratio of the polyethylene wax (A) and the resin (B) ((A)/(B)) is more preferably 25/75, still more preferably 15/85, particularly preferably 10/90, and most preferably 6/94. When the resin composition having the mass ratio ((A)/(B)) of lower than 0.1/99.9 is used for a toner, offset resistance or storage stability of the toner may become unsatisfactory. When the resin composition having the mass ratio ((A)/(B)) of more than 30/70 is used for a toner, fixability, particularly fixation stability over time after printing, may become unsatisfactory, and the toner may not be used for information storage because printed characters may be easily peeled off from the printed paper.

When the resin composition of the present invention is used for a hot melt composition, the mass ratio of the polyethylene wax (A) and the resin (B) ((A)/(B)) is preferably 1/99 to 50/50. The mass ratio is more preferably 15/85 to 45/55 in view of, e.g., easy lowering of melt viscosity while maintaining satisfactory adhesiveness.

<Polyethylene Wax (A)>
[Weight Average Molecular Weight Mw]

The polyethylene wax (A) used in the present invention has (i) a weight average molecular weight (Mw) in the range of 400 to 1,500, preferably 400 to 1,300, more preferably 400 to 1,000, and particularly preferably 500 to 1,000 as measured by GPC. When a polyethylene wax (A) having a weight average molecular weight (Mw) of 400 to 1500 is used for the resin composition, miscibility of the polyethylene wax (A) with the resin (B) or other resins increases because the resin composition contains only a small amount of components having too large molecular weight. Since the amount of components having too small molecular weight is also relatively small, the resin composition is free from the occurrence of excessive stickiness and, therefore, handleability of the resin composition becomes improved.

The weight average molecular weight (Mw) of the polyethylene wax (A) can be measured by GPC. The GPC measurement can be performed under conditions described below. The weight average molecular weight (Mw) and later-described number average molecular weight (Mn) can be obtained by preparing a calibration curve using a commercially available monodisperse standard polystyrene (PS), and on the basis of a conversion method described below.

[Measurement Conditions]

Apparatus: gel permeation chromatograph, Alliance GPC2000 (manufactured by Waters)

Organic solvent: o-dichlorobenzene

Columns: two TSKgel GMH6-HT columns and two TSKgel GMH6-HTL columns (both manufactured by Tosoh Corporation)

Flow rate: 1.0 ml/min

Sample: 0.15 mg/mL o-dichlorobenzene solution

Temperature: 140° C.

Molecular weight conversion: polyethylene (PE) conversion/general-purpose calibration For calculation of the general-purpose calibration, coefficients of Mark-Houwink viscosity equation can be used. As the Mark-Houwink coefficients for PS and PE, values described in literatures (J. Polym. Sci., Part A-2, 8, 1803 (1970), and Makromol. Chem., 177, 213 (1976)) can be used.

[Mw/Mn]

The polyethylene wax (A) used in the present invention has (ii) a molecular weight distribution (Mw/Mn) in the range of 1.2 to 2.5, preferably 1.3 to 2.5 as measured by GPC. When the polyethylene wax (A) having Mw/Mn of 1.2 to 2.5 is used for the resin composition, it becomes possible to suppress the occurrence of stickiness and blocking caused by the components having too small molecular weight and also the accompanying decrease in handleability of the resin composition. Further, it becomes possible to suppress the decrease in miscibility of the polyethylene wax (A) with the resin (B) or other resins which is caused by the components having too large molecular weight.

[Penetration Index]

The polyethylene wax (A) used in the present invention has (iii) a penetration index of 5 dmm or less, preferably 4 dmm or less as measured in accordance with JIS K 2207 at 25° C.

When the polyethylene wax (A) having a penetration index of 5 dmm or less as measured in accordance with JIS K 2207 at 25° C. is used for the resin composition, hardness of the resin composition becomes increased so that spontaneous deformation of the resin composition or spontaneous binding among the resin compositions can be easily suppressed.

[Melting Point (Tm)]

The polyethylene wax (A) used in the present invention has (iv) a melting point (Tm) in the range of 50 to 110° C., preferably 60 to 110° C., more preferably 65 to 110° C., and particularly preferably 65 to 100° C. as measured by differential scanning calorimetry (DSC). When the polyethylene wax (A) having a melting point (Tm) of 50 to 110° C. is used for the resin composition, it becomes possible to lower the melting or deformation temperature of the resin composition.

The melting point (Tm) of the polyethylene wax (A) can be measured by DSC (differential scanning calorimetry) using DSC-20 (manufactured by Seiko Electronics Industrial Co., Ltd.). A sample about 10 mg is subjected to temperature elevation from −20° C. to 200° C. at a rate of 10° C./min to thereby obtain a curve, and an endothermic peak of the curve can be used as the melting point. Before the above temperature elevation measurement, thermal histories of the samples (polyethylene waxes (A)) are preferably standardized by subjecting each sample (polyethylene wax (A)) to temperature elevation once to about 200° C., maintaining thereat for 5 minutes and, then, lowering the temperature to ambient temperature (−20° C.) at a rate of 20° C./min. When the obtained curve has a plurality of the endothermic peaks, the melting point (Tm) is defined as the peak temperature of an endothermic peak having a largest endothermic amount.

[Heat of Fusion (ΔH)]

The polyethylene wax (A) used in the present invention has (v) a fraction of a heat of fusion ($\Delta H_{-50}$) derived from a peak at 50° C. or lower, relative to total heat of fusion ($\Delta H_{all}$) derived from all peaks, being generally 1.0% to 20.0%, preferably 1.0% to 10.0%, and more preferably 1.0% to 5.0%, as measured by differential scanning calorimetry (DSC).

When the fraction of a heat of fusion ($\Delta H_{-50}$) derived from a peak at 50° C. or lower is in the above range, by using such polyethylene wax (A) in the resin composition, it becomes possible to lower the melting or deforming temperature of the resin composition. When the fraction of a heat of fusion ($\Delta H_{-50}$) derived from a peak at 50° C. or lower is not more than the above-mentioned upper limit, spontaneous deformation of the resin composition or spontaneous binding among the resin compositions becomes less likely to occur.

The heat of fusion (ΔH) can be obtained by calculating the heat of fusion (ΔH) (J/g) from an area partitioned by the endothermic peak and the base line for the whole endothermic peak obtained by the DSC.

[Number of DSC Melting Peaks]

The polyethylene wax (A) used in the present invention preferably has (vi) 2 or more melting peaks as measured by DSC. When the polyethylene wax (A) having 2 or more melting peaks as measured by DSC is used for the resin composition, melting or deformation of the resin composition starts at a peak at a lower temperature side of the DSC curve. However, excessive melting or deformation which may cause a spontaneous deformation of the resin composition or spontaneous binding among the resin compositions is unlikely to occur until the temperature reaches the peak at a higher temperature side of the curve.

When the number of melting peaks as measured by DSC is 2 or more, the difference between peak temperatures of two adjacent melting peaks is preferably 5° C. or more and 30° C. or less.

[Molecule Weight and Melt Viscosity]

In the polyethylene wax (A) used in the present invention, it is preferred that (vii) the content of components having a molecular weight of 5,000 or more and melt viscosity satisfy the specific relationship represented by following formula (I):

$$B \leq 0.15 \times K \qquad \text{formula (I)}.$$

In formula (I) above, B (hereinafter also referred to as B value) is a content (mass %) of components having a molecular weight of 5,000 or more in the polyethylene wax (A), the molecular weight being measured in terms of polyethylene by gel permeation chromatography. K is a melt viscosity (mPa·s) of the polyethylene wax (A) as measured using Brookfield (B-type) viscometer at 140° C.

The polyethylene wax (A) satisfying the above formula (I) contains only a small amount of components having too large molecular weight. Therefore, when such polyethylene wax (A) is used for the resin composition, it becomes possible to suppress the decrease in miscibility of the polyethylene wax (A) with the resin (B) or other resins.

[Intrinsic Viscosity [η]]

The polyethylene wax (A) used in the present invention preferably has an intrinsic viscosity [η] in the range of 0.01 to 10 dl/g as measured in 135° C. decalin. The intrinsic viscosity [η] of the polyethylene wax (A) used in the present invention is more preferably 0.02 dl/g or more, and still more preferably 0.03 dl/g or more. Furthermore, the intrinsic viscosity [η] is more preferably 0.09 dl/g or less, still more preferably 0.08 dl/g or less, and particularly preferably 0.07 dl/g or less.

When the polyethylene wax (A) having the intrinsic viscosity [η] of 0.10 dl/g or less is used, miscibility of the polyethylene wax (A) with the resin (B) or other resins is likely to become increased. When the polyethylene wax (A) having the intrinsic viscosity [η] of 0.01 dl/g or more is used, not only improvement in miscibility of the polyethylene wax (A) with the resin (B), but also handleability of the resin composition becomes improved because the resin composition contains only a relatively small amount of components which cause excessive stickiness.

[Composition]

The polyethylene wax (A) used in the present invention contains a constituent unit derived from ethylene.

The polyethylene wax (A) used in the present invention is preferably an ethylene homopolymer. The polyethylene wax (A) used in the present invention may contain a small amount of a constituent unit derived from $C_{3-10}$ α-olefin other than ethylene, for example, in an amount of less than 0.1 mol % relative to the total constituent units of the polyethylene wax (A). Specific examples of the α-olefins having 3 or more carbon atoms include propylene, 1-butene, 1-hexene, 4-methyl-1-pentene, 1-octene and 1-decene. On the other hand, the polyethylene wax (A) containing no constituent unit derived from $C_{3-10}$ α-olefin is preferred from the viewpoint of storage stability of a toner containing the polyethylene wax (A).

The polyethylene wax (A) used in the present invention may contain a constituent unit derived from a polymerizable olefin monomer other than ethylene in an amount of 0.1 mol % or less, relative to the total constituent units of the polyethylene wax (A). Examples of the polymerizable olefin monomers include vinyl acetate; unsaturated carboxylic acids such as acrylic acids and methacrylic acids; unsaturated carboxylates such as methyl acrylate, ethyl acrylate, isobutyl acrylate, n-butyl acrylate, 2-ethylhexyl acrylate, methyl methacrylate, glycidyl methacrylate and dimethyl maleate; and styrene. However, in view of hardness, the polyethylene wax (A) preferably contains no polymerizable olefin monomer.

<Method of Producing Polyethylene Wax (A)>

The polyethylene wax (A) according to the present invention may be obtained by directly polymerizing ethylene or the like, or by thermally decomposing a high-molecular weight ethylene copolymer. The polyethylene wax (A) may be purified, for example, by solvent fractionation in which the fractionation is carried out based on the difference in solubility to an organic solvent, or by distillation. The polyethylene wax (A) may be obtained from a single type of ethylene polymer or from a mixture of 2 or more different types of ethylene polymers.

For obtaining the polyethylene wax (A) according to the present invention by directly polymerizing ethylene or the like, use can be made of various conventional production methods, such as polymerization of ethylene, together with a $C_{3-10}$ α-olefin as necessary, by using a catalyst, e.g., a Ziegler/Natta catalyst or a metallocene catalyst.

In the present invention, the polymerization of the polyethylene wax (A) can be performed by, e.g., a suspension polymerization method in which the polymerization is carried out in the presence of a monomer to be polymerized and polymerized polyethylene wax (A) which are both present in a particulate form in an inert hydrocarbon medium such as hexane; a vapor phase polymerization method in which the polymerization is carried out without using a solvent; or a solution polymerization method in which the polymerization is carried out in a state where a monomer to be polymerized and the polymerized polyethylene wax (A) are in a molten state in the presence or absence of an inert hydrocarbon medium. Among the above-mentioned methods, the solution polymerization method is preferred in view of both economic efficiency and quality. The polymerization reaction may be performed in either a batchwise manner or a continuous manner. The polymerization may be divided into two or more steps each performed under different reaction conditions.

Examples of the inert hydrocarbon mediums used in the suspension polymerization method and solution polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane. The inert hydrocarbon media may be used individually or in combination. In addition, use can be made of a so-called bulk polymerization method in which a liquefied α-olefin subjected to the polymerization reaction is used as a solvent.

The catalyst is preferably a metallocene catalyst. As such a metallocene catalyst, for example, suitable catalyst is composed of (a) a metallocene compound of a transition metal selected from elements of the 4th group of the periodic table, and at least one compound (b) selected from the group consisting of (b-1) an organoaluminumoxy compound, (b-2) a compound that reacts with the metallocene compound (a) and forms an ion pair (hereinafter also simply referred to as "ionizing ionic compound"), and (b-3) an organoaluminum compound (refer to Japanese Patent Application Laid-Open No. 08-239414 and WO2007/114102).

Examples of the metallocene compounds (a) of a transition metal selected from elements of the 4th group of the periodic table include metallocene compounds described in Japanese Patent Application Laid-Open No. 08-239414 and WO2007/114102. Among these, bis(n-butylcyclopentadienyl)zirconium dichloride and bis(n-butylcyclopentadienyl) zirconium dimethyl are particularly suitable.

As the organoaluminumoxy compound (b-1), a conventional aluminoxane can be used per se. Examples of the organoaluminumoxy compounds include organoaluminumoxy compounds described in Japanese Patent Application Laid-Open No. 08-239414 and WO2007/114102. The organoaluminumoxy compound (b-1) is preferably methylaluminoxane which can be easily obtained as a commercial product, or a modified methylaluminoxane (MMAO) prepared from trimethylaluminum and tri-isobutyl aluminum.

Examples of the ionizing ionic compounds (b-2) include ionizing ionic compounds described in Japanese Patent Application Laid-Open No. 08-239414 and WO2007/114102. The ionizing ionic compound (b-2) is preferably triphenylcarbenium tetrakis(pentafluorophenyl)borate or N,N-dimethylanilinium tetrakis(pentafluorophenyl)borate, which can be easily obtained as a commercial product and which substantially contributes to the improvement of polymerization activity.

Examples of the organoaluminum compounds (b-3) include organoaluminum compounds described in WO2007/114102. The organoaluminum compound (b-3) is preferably trimethylaluminum, triethylaluminum or triisobutylalminum, which can be easily obtained as a commercial product. Triisobutylalminum, which can be handled easily, is particularly preferred.

As at least one compound (b) selected from the group consisting of the compounds of (b-1) to (b-3), most preferred are the combination of triisobutylalminum and triphenylcarbenium tetrakis(pentafluorophenyl)borate, and the combination of triisobutylalminum and N,N-dimethylanilinium tetrakis(pentafluorophenyl)borate which substantially contribute to the improvement of polymerization activity.

For the polymerization of a monomer using the above-mentioned metallocene catalyst for olefin polymerization, the contents of the components can be set as follows.

(1) The metallocene compound (a) can be used in an amount of $10^{-9}$ to $10^{-1}$ mol, preferably $10^{-8}$ to $10^{-2}$ mol per one liter of a reaction volume.

(2) When using a catalyst containing the metallocene compound (a) and the organoaluminumoxy compound (b-1) as components for the olefin polymerization catalyst, the compound (b-1) can be used in an amount such that the molar ratio (Al/M) between aluminum atoms (Al) of the compound (b-1) and total transition metal atoms (M) of the metallocene compound (a) is 0.01 to 5,000, and preferably 0.05 to 2,000.

(3) When using a catalyst containing the metallocene compound (a) and the ionic compound (b-2) as components for the olefin polymerization catalyst, the compound (b-2) can be used in an amount such that the molar ratio (b-2/M) between the compound (b-2) and total transition metal atoms (M) of the metallocene compound (a) is 1 to 10, and preferably 1 to 5.

(4) When using a catalyst containing the metallocene compound (a) and the organoaluminum compound (b-3) as components for the olefin polymerization catalyst, the compound (b-3) can be used in an amount such that the molar ratio (b-3/M) between the compound (b-3) and total transition metal atoms (M) of the metallocene compound (a) is generally 0.01 to 50,000, and preferably 0.05 to 10,000.

The polymerization temperature is generally in the range of 10 to 200° C. From the view point of production of a polyethylene wax (A) containing the α-olefin derived unit in an amount within the above-mentioned suitable range, the polymerization temperature is preferably 60 to 180° C. and more preferably 75 to 170° C. The polymerization pressure can be normal pressure to 7.8 MPa-G (G is gauge pressure), and preferably normal pressure to 4.9 MPa-G (G is gauge pressure).

A molecular weight modifier such as hydrogen can be added during polymerization.

When polymerization is performed in the above manner, the produced polymer is generally obtained in a form of a polymerization liquid containing the same and, therefore, the polyethylene wax (A) can be obtained by treating the polymerization liquid by a conventional method.

In the present invention, the polymer obtained by the above-mentioned method can be further purified by, e.g., a method in which the polymer is degassed at a temperature at or above the melting point under vacuum; a method in which the polymer is dissolved in a solvent such as toluene, xylene, hexane or heptane, followed by addition of a polar solvent such as methanol or acetone, and the mixture is filtered for removing low-molecular weight components; or a method in which whole of the polymer is dissolved in a solvent and precipitated at a specific temperature for removing low-molecular weight components or high-molecular weight components.

The weight average molecular weight Mw and intrinsic viscosity[η] of the polyethylene wax (A) according to the present invention are likely to become small by the elevation of the polymerization temperature or increase in hydrogen concentration. Therefore, the weight average molecular weight Mw and intrinsic viscosity[η] can be controlled to fall within the above respective ranges. The weight average molecular weight Mw and intrinsic viscosity[η] can also be adjusted based on the amount of the organoaluminumoxy compound and/or ionizing ionic compound used as a co-catalyst. Further, the adjustment is also possible by the purification after polymerization.

Mw/Mn of the polyethylene wax (A) according to the present invention can be controlled by the change of a catalyst species, polymerization temperature, or the like. In general, a Ziegler/Natta catalyst or a metallocene catalyst is used for the polymerization of a polyethylene wax, but for adjusting the Mw/Mn to fall within a suitable range, the metallocene catalyst is preferred.

The penetration index of the polyethylene wax (A) can be controlled to fall within the range by the change of a catalyst species, polymerization temperature, or the like. The penetration index can also be adjusted by the purification after polymerization.

The melting point of the polyethylene wax (A) can be controlled to fall within the range by the change of a catalyst species, polymerization temperature, or the like. The melting point can also be adjusted by the purification after polymerization.

The number of endothermic peaks of the polyethylene wax (A) can be controlled by the change of a catalyst species, polymerization temperature, or the like. The number of endothermic peaks can also be adjusted by mixing 2 or more polyethylene waxes.

The fraction of a heat of fusion ($\Delta H_{-50}$) derived from a peak at a temperature of 50° C. or lower, relative to total heat of fusion ($\Delta H_{all}$) derived from all peaks, can be controlled to fall within the above range by the change of a catalyst species, polymerization temperature, or the like. The fraction can also be adjusted by the purification after the polymerization.

When necessary, an additive may be added to the polyethylene wax (A) according to the present invention, as long as the additive does not impair the object of the present invention. Such an additive may be a weathering stabilizer, a heat resistant stabilizer, an antistatic agent, a slipping preventing agent, an antiblocking agent, an anti-fogging agent, a nucleating agent, a lubricant, a pigment, a dye, a plasticizer, an age resistor, a hydrochloric acid absorber, an antioxidant, a copper inhibitor, a filler or the like.

The polyethylene wax (A) according to the present invention can be used not only as the additive for a toner or the hot melt composition for a hot melt adhesive, but also for various applications, such as an additive for a coating, a glazing agent, a fluidity improver for a polyolefin or various thermoplastic or thermosetting resins including engineering plastics, a resin strength improver, a resin compatibilizing agent, a resin lubricant, a resin hardness/melting point adjusting agent, a mold release agent for resin molding, a mold release agent for urethane, a processing aid for rubbers, an antioxidant for rubber, a paper quality improver, various additives for a printing ink including an anti-wear additive and a leveling agent, an additive for a thermal transfer ink, a fiber processing aid, an electrical insulating agent, an additive for natural wax, an anti-fogging agent for a polyolefin film, a pigment dispersant (for pigment master batch), a molding processing aid, an antioxidant for rubber, a paper coating, an emulsion component, an additive for a floor polish, a fiber finishing agent, a lubricant for a polyvinyl chloride, a heat resistant lubricant for a polyvinyl chloride, an additive for an asphalt, a nucleating agent for an expanded polystyrene, an additive for lost wax, a component of a candle, an additive for electrical cable compound, a resin compounding agent for a 3D printer, a coating agent, a paint, a primer, an adhesive, a heat sealing agent, a binder for an ink, a filler or pigment dispersion aid contained in a paint, a binder for ceramics or a metallurgical formulation, a non-woven fabric modifier, a nucleating agent for an expanded polystyrene, a sintering aid, or a natural fiber-based plastic additive. The natural fiber-based plastic additive is a mixture of a thermoplastic resin and natural fiber such as wood powder or cellulose, and can be used as an additive for improving moldability, workability, dispersibility, and surface property.

<Resin (B)>

Resin (B) contained in the resin composition of the present invention is at least one resin selected from the group consisting of a thermoplastic resin and a thermosetting resin. Examples of the thermoplastic resins include olefin-based resins, styrene-based resins, thermoplastic polyester resins, polyamides, polycarbonates, polyacetals, polyphenylene oxides, polyimides, polyvinyl alcohols, polyvinyl acetates, acrylic resins, rosin resin, alkyd resins, coumarone resins, ketone resins, cellulose-based resins, chlorinated polyolefins, and mixed resins thereof.

Examples of the thermosetting resins include polyurethanes, epoxy resins, thermosetting unsaturated polyester resins, urea resins, melamine resins, phenolic resins, and mixed resins thereof.

The resin (B) may consist of either one type of resin selected from the thermoplastic resins and the thermosetting resins, or the combination thereof.

The thermoplastic resin or thermosetting resin may contain a fiber or organic filler, as long as the object of the present invention is not impaired.

Definition and production methods for a thermoplastic resin or thermosetting resin are known in the art and are, for example, described in publications such as "Jitsuyō Purasuchikku Men (Practical Plastic Encyclopedia)" (Jitsuyō Purasuchikku Jiten Editorial Committee ed., published by Sangyochosakai Corp.).

The resin (B) is preferably a thermoplastic resin. Since the polyethylene wax (A) and resin (B) can be mixed at a high temperature (e.g., 100° C. or more), using a thermoplastic resin as resin (B) prevents curing of the resin (B) in the mixture and enables uniform dispersion of the polyethylene wax (A) in the resin (B).

The resin (B) may be a resin in which a polar monomer is graft copolymerized as necessary. Examples of the polar monomers include hydroxyl group-containing ethylenically unsaturated compounds, amino group-containing ethylenically unsaturated compounds, epoxy group-containing ethylenically unsaturated compounds, unsaturated carboxylic acids and anhydrides thereof and derivatives thereof, and vinyl ester compounds.

[Resin (B) for the Resin Composition of Present Invention Used for Toner Application]

As described later, when the resin composition of the present invention is used as a toner, the resin (B) according to the present invention corresponds to a toner binder resin. As the toner binder resin, any of various known binder resins may be used as the resin (B). Specific examples of the binder resins include styrene-based polymers; ketone resins; maleic acid resins; polyester resins such as aliphatic polyester resins, aromatic polyester resins, and aliphatic-aromatic polyester resins; coumarone resins; phenolic resins; epoxy resins; terpene resins; polyvinylbutyral; polybutyl methacrylate; polyvinyl chlorides; polyethylene (with the proviso that Mw is more than 1,500); polypropylene; polybutadiene; and amorphous resins such as ethylene-vinyl acetate copolymer.

The toner binder resins may be used individually or in combination. Among the above-mentioned toner binder resins, at least one resin selected from the group consisting of a polyester resin and a styrene-based polymer is preferred, and a styrene-based polymer is particularly preferred in view of an appropriate softening point about 100° C. and satisfactory fixability of the resin.

Examples of the styrene-based polymers include homopolymers or copolymers consisting of styrene-based monomers, and copolymers of a styrene-based monomer and another vinyl-based monomer. Examples of the styrene-based monomers include styrene, p-chlorostyrene, and vinylnaphthalene.

Examples of other vinyl-based monomers include, but are not limited to, ethylenically unsaturated monoolefins such as ethylene, propylene, 1-butene and isobutene; halogenated vinyls such as vinyl chloride, vinyl bromide and vinyl fluoride; vinyl esters such as vinyl acetate, vinyl propionate, vinyl benzoate and vinyl butyrate; α-methylene aliphatic monocarboxylic acids such as acrylic acid and methacrylic acid; α-methylene aliphatic monocarboxylic acid esters such as methyl acrylate, ethyl acrylate, n-butyl acrylate, isobutyl acrylate, n-octyl acrylate, dodecyl acrylate, 2-chloroethyl acrylate, phenyl acrylate, methyl α-chloroacrylate, methyl methacrylate, ethyl methacrylate and butyl methacrylate; nitriles and amides such as acrylonitrile, methacrylonitrile and acrylamide; vinyl ethers such as vinyl methyl ether, vinyl ethyl ether, vinyl propyl ether and vinyl isobutyl ether; vinyl ketones such as vinyl methyl ketone, vinyl hexyl ketone and vinyl isopropenyl ketone; N-vinyl compounds such as N-vinylpyrrole, N-vinylcarbazole, N-vinylindole and N-vinylpyrrolidone; itaconic acid esters such as dimethyl itaconate, dipropyl itaconate, dioctyl itaconate and diamyl itaconate; maleic acid esters; and fumaric acid esters.

Among those vinyl monomers, α-methylene aliphatic monocarboxylic acid esters are preferred.

The styrene-based polymer can be produced by a known polymerization method such as a bulk polymerization method, a solution polymerization method, a suspension polymerization method or an emulsion polymerization method.

[Resin (B) for the Resin Composition of Present Invention used for Hot Melt Composition Application]

As described later, when the resin composition of the present invention is used as a hot melt composition, the resin (B) may be any generally used polymer for a hot melt adhesive. Examples of such polymers include the followings.

1) Polyethylene (with the proviso that Mw is more than 1,500)

2) Ethylene-vinyl acetate copolymers (EVA)

3) Modified EVA polymers such as saponified EVA and graft modified EVA

4) Ethylene-(meth)acrylate copolymers such as ethylene-(meth)acrylate (EEA) (with the proviso that Mw is more than 1,500)

5) Ionomer resins obtained by partially neutralizing an ethylene-(meth)acrylic acid copolymer (a specific example of the ionomer resin is available from Du Pont-Mitsui Polychemicals Co., Ltd. under a trade name of Himilan)

6) Ethylene-propylene copolymers and ethylene-propylene-(meth)acrylic acid terpolymers (with the proviso that Mw is more than 1,500)

7) Polyamides: Reaction products of a dibasic acid and a diamine, for example, reaction products of a dimer acid, i.e., a dimer of a fatty acid of soy bean oil, China wood oil, tall oil or the like, and an alkyl diamine such as ethylenediamine or diethylenetriamine; and nylons such as nylon 12 (specific examples of the polyamides include Diamide (Dicel Chemical Industries, Ltd.), Platiron (Toagosei Chemical Industry Co., Ltd.) and Amilan (Toray Industries Inc.))

8) Polyesters, for example, Ester Resin 200 and 300 (Toyobo Co., Ltd.) and Vita 1200 and 300 (Goodyear)

9) Propylene-based polymers, for example, atactic polypropylenes and propylene-$C_{4+}$ α-olefin copolymers 10) Copolymers of a vinyl aromatic compound and a conjugated diene compound, and hydrogenated products thereof (specific examples of the copolymers and the hydrogenated products include styrene-butadiene random copolymers, styrene-isoprene random copolymers, butadiene-polystyrene block copolymers, polystyrene-polyisoprene block copolymers, polystyrene-polyisoprene-polystyrene triblock copolymers, polystyrene-polybutadiene-polystyrene triblock copolymers, poly(α-methylstyrene)-polybutadiene-poly(α-methylstyrene) triblock copolymers, and hydrogenated products thereof)

As the resin (B), preferred are 2) ethylene-vinyl acetate copolymers (EVA), 6) ethylene-propylene copolymers, 6) ethylene-propylene-(meth)acrylic acid terpolymers and 9) propylene-based polymers. In view of the compatibility with the polyethylene wax (A), 2) ethylene-vinyl acetate copolymers (EVA) are particularly preferred.

Those resins (B) can be obtained as commercial products. Examples of such resins (B) include Cariflex TR-1101, TR-1107 and TR-4113 (manufactured by Shell Chemicals), Kraton G-6500, G-6521, G-1650, G-1652 and G-1657 (manufactured by Shell Chemicals), and Solprene and hydrogenated Solprene (manufactured by Philips). The resins (B) may be used individually or in combination.

<Resin Composition>

The resin composition of the present invention contains the above polyethylene wax (A) and resin (B).

[Other Materials Contained]

When necessary, the resin composition of the present invention may contain an additive, as long as the additive does not impair the object of the present invention. Such an additive may be another thermoplastic resin, a weathering stabilizer, a heat resistant stabilizer, an antistatic agent, a slipping preventing agent, an anti-blocking agent, an anti-fogging agent, a nucleating agent, a lubricant, a pigment, an organic filler, a fiber, a filler, a dye, a plasticizer, an age resistor, a hydrochloric acid absorber, an antioxidant, a copper inhibitor or the like. Examples of the fibers include glass fibers, carbon fibers, natural fibers (such as wood powder, woody fiber, bamboo, cotton wool, cellulose and nanocellulose-based fiber), and agricultural fibers (such as straw, hemp, flax, kenaf, kapok, jute, ramie, sisal hemp, henequen, corn fiber, coir, nut shell and chaff). Examples of the organic fillers include lignin, starch and products containing the same.

The type of the glass fiber is not especially limited, and roving glass, chopped strand glass, milled glass or the like may be used. The glass fiber may be used individually or in combination.

The shape and type of the carbon fiber are not especially limited. The carbon fiber may be in a shape of a chopped strand, a roving strand, a milled fiber or the like, and the type may be either a pitch type or a polyacrylonitrile type. In addition to a carbon fiber obtained by spinning or molding a raw material composition and carbonizing the resultant composition, a carbon fiber obtained basically without a spinning process, as in vapor phase epitaxy, may be also used.

Examples of the fillers used herein include amorphous fillers such as calcium carbonate, silica, kaolin, clay, titanium oxide, barium sulfate, zinc oxide, aluminum hydroxide, alumina and magnesium hydroxide; plate-shaped fillers such as talc, mica and glass flake; needle-shaped fillers such as wollastonite, potassium titanate, basic magnesium sulfate, sepiolite, xonotlite and aluminum borate; metal powder, metal flakes, and other fillers such as carbon black and carbon fine particles. Glass beads and glass powder can also be used. The above-mentioned fillers may be used individually or in combination, or the fillers having a carbon coating or a silane coupling treatment on the surface thereof may be used individually or in combination.

The resin composition of the present invention can be produced by any of various methods such as dry blending or melt blending. As a specific method, there can be mentioned a method in which the polyethylene wax (A), the resin (B) and any other components are blended at once or in an arbitrary order by using a tumbler, a V-blender, a Nauta mixer, a banbury mixer, a kneading roll, a single-screw or twin-screw extruder or the like. Alternatively, the polyethylene wax (A), the resin (B) and any other components may be blended by, firstly, dispersing or dissolving the same in an solvent and, then, drying the resultant dispersion or solution by an appropriate method such as natural drying, or forced drying by heating.

<Electrophotographic Toner>

The electrophotographic toner according to an embodiment of the present invention contains the above resin composition and a colorant. When necessary, the toner of the present invention further contains, in addition to the resin composition and the colorant, a charge controlling agent, a mold release agent, a pigment dispersant, or the like.

[Colorant]

Examples of the colorants contained in the toner of the present invention include conventional black color pigments, such as carbon black, acetylene black, lamp black and magnetite; conventional inorganic pigments such as chrome yellow, yellow iron oxide, titanium oxide and zinc oxide; conventional organic pigments such as Hansa Yellow quinoline yellow lake, permanent yellow NCG molybdenum orange, Vulcan orange, indanthrene, brilliant orange GK, red iron oxide, brilliant carmine 6B, fulizarin lake, methyl violet lake, fast violet B, cobalt blue, alkali blue lake, phthalocyanine blue, fast sky blue, pigment green B, malachite green lake. The content of the colorant is, in general, 5 to 250 parts by mass relative to 100 parts by mass of the resin composition.

[Other Components]

When necessary, a conventional mold release agent may be added as a part of the toner of the present invention, as long as the mold release agent does not impair the object of the present invention. Such a mold release agent may be polyvinyl chloride, polyvinyl acetate, polyolefin, polyester, polyvinyl butyral, polyurethane, polyamide, rosin, modified rosin, a terpene resin, a phenolic resin, an aliphatic hydrocarbon resin, an aromatic petroleum resin, paraffin wax, polyolefin wax (exclusive of the polyethylene wax (A) used in the present invention), ceramic wax, natural waxes, such as rice wax, sugar wax, Urushi wax, beeswax, carnauba wax, candelilla wax and montan wax, a fatty acid amide wax, a polyvinyl chloride resin, a styrene-butadiene resin, a coumarone-indene resin or a melamine resin. The amount of the mold release agent is 0.1 to 40 parts by mass relative to 100 parts by mass of the resin composition.

Examples of monomers constituting the polyolefin wax (exclusive of the polyethylene wax (A) used in the present invention) include ethylene, propylene, 1-butene, 1-pentene and all of other olefin monomers. The polyolefin wax obtainable from the monomers may be a homopolymer type obtained from a single monomer or a copolymer type obtained from 2 or more types of monomers. The polyolefin wax may be an unmodified polyolefin wax, or a modified polyolefin wax in which a modifying component is block copolymerized or graft copolymerized with an olefin component. Examples of the modifying components in the modified polyolefin wax include aromatic monomers, such as styrene, methylstyrene, p-ethylstyrene and p-n-butylstyrene; monocarboxylic acid ester monomers, such as methyl (meth)acrylate and ethyl (meth)acrylate; dicarboxylic acids, such as maleic acid, fumaric acid, itaconic acid, crotonic acid, nadic acid and methylhexahydrophthalic acid; and anhydrides, such as maleic anhydride, itaconic anhydride, citraconic anhydride, allylsuccinic anhydride, glutaconic anhydride and nadic anhydride.

As the charge controlling agent, a conventional charge controlling agent, such as nigrosine, a quaternary ammonium salt or a metal-containing azo dye, may be selected and used as appropriate. The amount of the charge controlling agent is 0.1 to 10 parts by mass relative to 100 parts by mass of the resin composition, which is a typically used amount.

[Method of Producing Electrophotographic Toner]

The toner of the present invention may be produced by any conventional method, such as by subjecting each component to contact dispersion, melt dispersion or solution dispersion.

For the production of the toner of the present invention by melt dispersion, for example, the above polyethylene wax (A), the above resin (B) for use as a toner binder resin, a colorant, a charge controlling agent, a mold release agent and the like are premixed with a mixing machine such as a ball mill or a Henschel mixer. The mixture is then kneaded in a heated molten state with a heating kneader, such as a heating roll kneader or a single-screw or twin-screw kneader, followed by cooling and pulverization by a pulverizer such as a hammer mill. The resultant particles are classified by an air classifier and generally, a toner is obtained by collecting particles having a diameter of 8 to 20 μm.

The heating and melting conditions for the kneading with the twin-screw kneader may vary based on the properties, such as a melting point, of the resin (B) for use as a toner binder resin. For example, when the resin (B) is a polar group-containing vinyl polymer such as a styrene-acrylic based resin, it is preferred that the resin temperature at a discharge section of the twin-screw kneader is lower than 190° C. and the residence time is less than 180 seconds. As a cooling method, a rapid cooling using a steel belt cooler or the like is preferred.

Alternatively, the kneading may be performed by a method in which a master batch is prepared in advance by kneading the above polyethylene wax (A) with the resin (B) for use as a toner binder resin under the conditions such that the polyethylene wax (A) content is high, and further kneading the master batch with other components such as a toner binder resin and a colorant. This method is effective when the resin (B) for use as a toner binder resin and the polyethylene wax (A) are relatively immiscible with each other.

Upon preparation of the above master batch, the above polyethylene wax (A) is used in an amount of 5 to 900 parts by mass, preferably 5 to 300 parts by mass, more preferably 5 to 100 parts by mass and particularly preferably 5 to 50 parts by mass, relative to 100 parts by mass of the resin (B) for use as a toner binder resin.

The toner of the present invention can be produced also by a method which includes a mixing step for mixing a resin particle dispersion containing resin particles dispersed in a dispersing agent, a colorant dispersion containing colorant particles dispersed in a dispersing agent, and a mold release agent particle dispersion containing polyethylene wax (A) particles dispersed in a dispersing agent; an aggregation step for forming aggregated particles having a diameter corresponding to the toner particle diameter; and a fusion step for fusing the aggregated particles by heating.

The toner of the present invention can be produced also by a method which includes a step for polymerizing a composition consisting of a polymerizable monomer, a colorant, the polyethylene wax (A), a charge controlling agent, and the like.

[Characteristics of Electrophotographic Toner]

The reason why the toner of the present invention has improved low-temperature printability, offset resistance and storage property by the use of the polyethylene wax (A) is not clear, but the present inventors have presumed as follows.

It is considered that when (i) the polyethylene wax (A) having a weight average molecular weight (Mw) of 400 to 1,500 is used for a toner, the thus obtained toner has excellent offset resistance and storage stability.

When the weight average molecular weight (Mw) of the polyethylene wax (A) is 1,500 or less, the amount of molecules having large molecular weight becomes small, and thus, miscibility of the polyethylene wax (A) with the resin (B) for use as a toner binder resin becomes satisfactory. Accordingly, the composition of the toner is likely to become uniform, and when toner particles melt and adhere to paper, the molten particles are more easily solidified and offset resistance can be easily improved even when the toner is fixed at a low temperature. It is also considered that uniform composition not only improves storage stability, but also prevents the fluctuation of toner quality. Furthermore, it is considered that small amount of large molecular weight molecules enables the toner to sufficiently infiltrate into a printing medium, thereby improving fixability and development durability of the print. On the other hand, when the weight average molecular weight (Mw) of the polyethylene wax (A) is 400 or more, the amount of molecules having too small molecular weight becomes small. As a result, blocking due to stickiness of the polyethylene wax (A), and separation of the polyethylene wax (A) from the resin composition containing the polyethylene wax (A) and the resin (B) for use as a toner binder resin are less likely to occur. Therefore, it is considered that property (i) improves not only storage stability of the toner, but also stability of the printed toner.

It is considered that when a resin composition used for the toner contains (ii) the polyethylene wax (A) having a molecular weight distribution (Mw/Mn) in the range of 1.2 to 2.5 as measured by GPC, the resultant toner is likely to be free from blocking due to stickiness of the polyethylene wax (A) and exhibits improved miscibility of the polyethylene wax (A) with the resin (B) for use as a toner binder resin or with other resins. Similarly, storage stability and offset resistance of the toner fixed at a low temperature are considered to become improved by the use of the polyethylene wax.

It is considered that when a resin composition used for the toner contains (iii) the polyethylene wax (A) having a penetration index of 5 dmm or less as measured in accordance with JIS K 2207 at 25° C., storage stability of the toner becomes increased because the resin composition is less likely to suffer spontaneous deformation or spontaneous binding.

When a resin composition used for the toner contains (iv) the polyethylene wax (A) having a melting point (Tm) in the range of 50 to 110° C. as measured by DSC, it becomes possible to increase the low-temperature fixability of the toner. It is considered that, by virtue of other essential features, the toner of the present invention has not only low-temperature fixability, but also excellent storage stability.

(v) The fraction of a heat of fusion ($\Delta H_{-50}$) derived from a peak at a temperature of 50° C. or lower, relative to total heat of fusion ($\Delta H_{all}$), is generally 1.0% to 20.0%, preferably 1.0% to 10.0%, and more preferably 1.0% to 5.0%. Use of a resin composition containing the polyethylene wax (A) having the fraction of $\Delta H_{-50}$ in the above range enables an increase in low-temperature fixability of the toner. Further, when the fraction of a heat of fusion ($\Delta H_{-50}$) derived from a peak at a temperature of 50° C. or lower, relative to total heat of fusion ($\Delta H_{all}$), falls below the above-mentioned upper limit, the resin composition is less likely to suffer from spontaneous deformation or spontaneous binding among the resin composition, and it becomes easy for the toner to simultaneously exhibit low-temperature fixability and storage stability.

When a resin composition used for the toner contains (vi) the polyethylene wax (A) having 2 or more melting peaks, it becomes possible to fix the toner at a temperature corresponding to the peak at a lower temperature side and, therefore, the toner exhibits low-temperature fixability. Further, the toner is less likely to suffer deformation until the temperature reaches the peak at a higher temperature side and, therefore, the toner is considered to also exhibit storage stability. Especially when the polyethylene wax (A) showing two adjacent melting peaks in which the temperature difference between the peaks is 5° C. or more and 30° C. or less is used for the toner, it becomes easy for the toner to simultaneously exhibit low-temperature offset property and blocking resistance.

When a resin composition used for the toner contains (vii) the polyethylene wax (A) in which the content of components having a molecular weight of 5,000 or more (B value) and the melt viscosity (K) satisfy a specific relationship represented by the above formula (I), miscibility of the polyethylene wax (A) with the resin (B) for use as a toner binder resin or with other resins is considered to become satisfactory. Accordingly, the composition of the toner is likely to become uniform, and when toner particles melt and adhere to paper, the molten particles are more easily solidified and offset resistance is likely to become improved. It is also considered that uniform composition not only improves storage stability, but also prevents the fluctuation of toner quality.

When a resin composition used for the toner contains the polyethylene wax (A) having the intrinsic viscosity[η] of 0.10 dl/g or less, it becomes possible to obtain a toner having excellent offset resistance and storage stability. That is, when the intrinsic viscosity[η] is 0.10 dl/g or less, miscibility of the polyethylene wax (A) with the resin (B) for use as a toner binder resin or with other resins becomes increased. Accordingly, the composition of the toner is likely to become uniform, and once molten toner particles are more easily solidified and offset resistance is likely to become improved. It is also considered that uniform composition not only improves storage stability, but also prevents the fluctuation of toner quality. On the other hand, when the intrinsic viscosity[η] is 0.01 dl/g or more, blocking due to stickiness of the polyethylene wax (A), and separation of the polyethylene wax (A) from the resin composition containing the polyethylene wax (A) and the resin (B) for use as a toner binder resin become less likely to occur. Accordingly, the storage stability of the toner itself becomes improved and the stability of the printed material (printed toner) becomes satisfactory.

Since the polyethylene wax (A) according to the present invention has no polar group, it is considered that the polyethylene wax (A) rarely absorbs moisture, has low surface tension, and is appropriately dispersed in a binder resin. By virtue of such properties, the toner has improved storage property due to low occurrence of blocking, and exhibits improved offset resistance. Furthermore, it is considered that development durability becomes increased by an appropriate dispersion of the wax.

[Application of Electrophotographic Toner]

Although the applications of the toner of the present invention are not particularly limited, the toner can be also used as: a two-component or one and half-component developing agent by mixing with a carrier, a magnetic one-component developing agent without a carrier but with magnetic powder incorporated therein, a one-component developing agent without a carrier and magnetic powder, or a micro-toning developing agent. When the toner of the present invention is used as a two-component or one and half-component developing agent, any conventional carrier can be used as the carrier.

Examples of the carriers that can be used include magnetic powders, such as iron powder, ferrite powder and nickel powder; glass beads; and carriers obtained by treating surfaces thereof with a resin.

Examples of the resins used for coating the carrier surface include styrene-acrylic acid ester copolymers, styrene-methacrylic acid ester copolymers, acrylic acid ester copolymers, methacrylic acid ester copolymers, fluorine-containing resins, silicon-containing resins, polyamide resins, ionomer resins, polyphenylene sulfide resins, and mixtures thereof.

<Hot Melt Composition>

The hot melt composition according to an embodiment of the present invention contains the above resin composition and a tackifier (C).

[Tackifier (C)]

The tackifier (C) may be blended for controlling the viscosity of the polymer (B) contained in the above resin composition, the viscosity being the viscosity of molten polymer (B), and for improving hot tack property and wettability of the composition. Examples of the tackifiers (C) include aliphatic hydrogenated tackifiers, rosin, modified rosin and esterified products thereof, aliphatic petroleum resins, alicyclic petroleum resins, aromatic petroleum resins, copolymerized petroleum resins of an aliphatic component and an aromatic component, low-molecular weight styrene-based resins, isoprene resins, alkyl phenol resins, terpene resins, and coumarone-indene resins. The tackifiers (C) may be used individually or in combination.

The tackifier (C) may be appropriately selected in accordance with the resin (B) contained in the above resin composition. For example, when an ethylene-vinyl acetate copolymer (EVA) is used as the resin (B), an aromatic hydrocarbon resin, an alicyclic petroleum resin, (modified) rosin or the like is preferably used.

The content of the tackifier (C) is preferably 5 to 300 parts by weight, more preferably 50 to 200 parts by weight, relative to 100 parts by weight of the above resin composition. Such content is preferred in view of, e.g., high adhesive force exhibited while maintaining appropriate melt viscosity.

[Other Components]

The hot melt composition of the present invention may further contain an unmodified polyolefin, such as Sasol Wax (H-1: manufactured by Sasol), which is contained in a generally used hot melt adhesive. Use of such an unmodified polyolefin lowers the melt viscosity and improves the workability of the hot melt composition.

When necessary, the hot melt composition of the present invention may contain an additive, as long as the additive does not impair the object of the present invention. Such an additive may be various additives such as a softening agent, a weathering stabilizer, a heat resistance stabilizer, an antistatic agent, a slipping preventing agent, an antiblocking agent, an anti-fogging agent, a nucleating agent, a lubricant, a pigment, a filler, a dye, a plasticizer, an age resistor, a hydrochloric acid absorber, an antioxidant, a copper inhibitor or the like.

[Method of Producing Hot Melt Composition]

The hot melt composition of the present invention may be obtained by charging each component of the composition into a mixer such as a Brabender mixer, melting and mixing the components under heating, and then molding the resultant mixture into a desired form, e.g., particles, flakes, and bars.

[Application of Hot Melt Composition]

The hot melt composition of the present invention can be used, e.g., by heating and melting the hot melt composition and applying the molten composition to a material to be coated, such as a fabric, kraft paper, an aluminum foil or a polyester film by a common method to form a hot melt adhesive layer.

[Characteristics of Hot Melt Composition]

The reason why the hot melt composition of the present invention has improved heat-resistant adhesion and higher curing speed by the use of the above polyethylene wax (A) is not clear, but the present inventors have presumed as follows.

It is considered that the hot melt composition of the present invention is capable of melting even at a low temperature because it contains a polyethylene wax (A) having a low melting point.

It is considered that when (i) the polyethylene wax (A) having a weight average molecular weight (Mw) of 400 to 1,500 is used for a hot melt composition, heat-resistant adhesion becomes improved and curing speed becomes higher.

When the weight average molecular weight (Mw) of the polyethylene wax (A) is 1,500 or less, the amount of molecules having large molecular weight becomes small, and therefore, miscibility of the polyethylene wax (A) with the resin (B) or a tackifier becomes satisfactory. Accordingly, it is considered that the composition of the hot melt composition is likely to become uniform, and heat-resistant adhesion becomes improved and curing speed becomes higher. On the other hand, when the weight average molecular weight (Mw) of the polyethylene wax (A) is 400 or more, the amount of molecules having too small molecular weight becomes small. As a result, blocking due to stickiness of the polyethylene wax (A), separation of the polyethylene wax (A) from the hot melt composition, and inhibition of crystallization become less likely to occur. Therefore, it is considered that property (i) improves heat-resistant adhesion and increases curing speed.

It is considered that when a resin composition used for the hot melt composition contains (ii) the polyethylene wax (A) having a molecular weight distribution (Mw/Mn) in the range of 1.2 to 2.5 as measured by GPC, blocking due to stickiness of the polyethylene wax (A) becomes less likely to occur, and miscibility between the polyethylene wax (A) and the resin (B) or the tackifier becomes increased. Similarly, it is considered that heat-resistant adhesion becomes improved and curing speed becomes higher by the use of the polyethylene wax.

It is considered that when a resin composition used for the hot melt composition contains (iii) the polyethylene wax (A) having a penetration index of 5 dmm or less as measured in accordance with JIS K 2207 at 25° C., the heat-resistant adhesion of the hot melt composition becomes improved because the resin composition is less likely to suffer spontaneous deformation or spontaneous binding.

When a resin composition used for the hot melt composition contains (iv) the polyethylene wax (A) having a melting point (Tm) in the range of 50 to 110° C. as measured by DSC, it becomes possible to increase the low-temperature fixability of the hot melt composition. It is considered that, by virtue of other essential features, the hot melt composition of the present invention has not only low-temperature fixability, but also excellent heat-resistant adhesion.

(v) The fraction of a heat of fusion ($\Delta H_{-50}$) derived from a peak at a temperature of 50° C. or lower, relative to total heat of fusion ($\Delta H_{all}$), is generally 1.0% to 20.0%, preferably 1.0% to 10.0%, and more preferably 1.0% to 5.0%. Use of a resin composition containing the polyethylene wax (A) having the fraction of $\Delta H_{-50}$ in the above range enables an increase in curing speed of the hot melt composition. Further, when the fraction of a heat of fusion ($\Delta H_{-50}$) derived from a peak at a temperature of 50° C. or lower, relative to total heat of fusion ($\Delta H_{all}$), falls below the above-mentioned upper limit, the resin composition is less likely to suffer from spontaneous deformation or spontaneous binding among the resin composition, and it becomes easy for the hot melt composition to exhibit heat-resistant adhesion.

When a resin composition used for the hot melt composition contains (vi) the polyethylene wax (A) having 2 or more melting peaks, it becomes possible to fix the hot melt composition at a temperature corresponding to the peak at a lower temperature side and, therefore, the hot melt composition exhibits low-temperature fixability. Further, the hot melt composition is less likely to suffer deformation until the temperature reaches the peak at a higher temperature side and, therefore, the hot melt composition is considered to also exhibit heat-resistant adhesion. Especially when the polyethylene wax (A) showing two adjacent melting peaks in which the temperature difference between the peaks is 5° C. or more and 30° C. or less is used for the hot melt composition, it becomes easy for the hot melt composition to simultaneously exhibit low-temperature fixability and heat-resistant adhesion.

When a resin composition used for the hot melt composition contains (vii) the polyethylene wax (A) in which the content of components having a molecular weight of 5,000 or more (B value) and melt viscosity (K) satisfy a specific relationship represented by the above formula (I), miscibility of the polyethylene wax (A) with the resin (B) or the tackifier is considered to become satisfactory. Therefore, the hot melt composition is more easily solidified after melting and heat-resistant adhesion can be easily improved.

It is considered that when a resin composition used for the hot melt composition contains the polyethylene wax (A) having the intrinsic viscosity[$\eta$] of 0.10 dl/g or less, it is possible for the hot melt composition to have improved heat-resistant adhesion and higher curing speed. When the intrinsic viscosity[$\eta$] is 0.10 dl/g or less, miscibility of the polyethylene wax (A) with the resin (B) or the tackifier becomes increased. Accordingly, the composition of the hot melt composition is likely to become uniform, and the hot melt composition is more easily solidified after melting and heat-resistant adhesion can be easily improved. On the other hand, when the intrinsic viscosity[$\eta$] is 0.01 dl/g or more, blocking due to stickiness of the polyethylene wax (A), and separation of the polyethylene wax (A) from the hot melt composition become less likely to occur. Accordingly, it is possible for the hot melt composition to have improved heat-resistant adhesion and higher curing speed.

EXAMPLES

The present invention will now be more specifically described with reference to examples, and within the scope of the present invention, these examples should not be construed as limiting the invention.

Physical properties and the like of the examples and comparative examples were obtained by the following measurement methods.

<Method for Measuring Properties of Polyethylene Wax (A)>

(1) Methods for Measuring Weight Average Molecular Weight Mw, Molecular Weight Distribution (Mw/Mn) and B Value The number average molecular weight Mn and weight average molecular weight Mw of a polyethylene wax (A) were obtained from GPC measurement. The GPC measurement was performed under the conditions below. The number average molecular weight Mn and the weight average molecular weight Mw were obtained by preparing a calibration curve using a commercially available monodisperse standard polystyrene, and calculation based on a conversion method described below.

Apparatus: gel permeation chromatograph, Alliance GPC2000 (manufactured by Waters)
Solvent: o-dichlorobenzene
Columns: two TSKgel GMI-16-HT columns and two TSKgel GMI-16-HTL columns (both manufactured by Tosoh Corporation)
Flow rate: 1.0 ml/min
Sample: 0.15 mg/mL o-dichlorobenzene solution Temperature: 140° C.

Molecular weight conversion: PE conversion/general-purpose calibration

For calculation of the general-purpose calibration, the following coefficients of Mark-Houwink viscosity equation were used:

Coefficient of polystyrene (PS): KPS=1.38×10$^{-4}$, aPS=0.70

Coefficient of polyethylene (PE): KPE=5.06×10$^{-4}$, aPE=0.70.

The molecular weight distribution (Mw/Mn) was obtained by dividing Mw by Mn, based on the results of the above GPC measurements.

The B value was obtained as the content of components having a molecular weight of 5,000 or more in terms of mass %, based on the results of the above GPC measurements.

(2) Method for Measuring Penetration Index

In accordance with JIS K2207, a sample of a polyethylene wax (A), melted while avoiding partial superheating and bubble formation, was solidified by allowing the molten sample to stand at room temperature of 15 to 30° C. for 1 to 1.5 hours. Thereafter, the resultant sample was kept at 25° C. in a thermostat, and after the stabilization of sample temperature, the penetration index (dmm) was obtained as a depth of penetration of a specific needle from the surface of the sample within 5 seconds.

(3) Method for Measuring Melting Point (Tm), Heat of Fusion (ΔH) and Number of DSC Melting Peaks The melting point was measured by DSC (differential scanning calorimetry) using DSC-20 (manufactured by Seiko Electronics Industrial Co., Ltd.). About 10 mg of a sample (polyethylene wax (A)) was sealed in an aluminum pan and subjected to temperature elevation from -20° C. to 200° C. at a rate of 10° C./min to thereby obtain a curve, and an endothermic peak of the curve was used as the melting point. Before the above temperature elevation measurement, thermal histories of the samples were standardized by subjecting each sample to temperature elevation once to about 200° C., maintaining thereat for 5 minutes and, then, lowering the temperature to -20° C. at a rate of 20° C./min. When the obtained curve had two or more endothermic peaks, the melting point (Tm) was defined as the peak temperature of an endothermic peak having a largest endothermic amount.

Total heat of fusion (ΔH$_{all}$) was obtained by calculating an area(s) partitioned by the endothermic peak(s) and the base line for the whole endothermic peak obtained by the DSC. The fraction of a heat of fusion (ΔH$_{-50}$) derived from a peak at a temperature of 50° C. or lower, relative to total heat of fusion (ΔH$_{all}$), was obtained by calculating the heat of fusion (ΔH$_{-50}$) derived from a peak at a temperature of 50° C. or lower in the above mentioned manner, and dividing the calculated value by the total heat of fusion (ΔH$_{all}$).

The number of DSC melting peaks was obtained by measuring the number of endothermic peaks obtained by the DSC.

(4) Method for Measuring Melt Viscosity

The melt viscosity was measured using Brookfield viscometer (Type B) at 140° C.

(5) Method for Measuring Intrinsic Viscosity [η]

About 20 mg of the polyethylene wax (A) was dissolved in 15 ml of decalin, and specific viscosity $\eta_{sp}$ was measured in a 135° C. oil bath. The decalin solution was further diluted with additional 5 ml of decalin solvent, and specific viscosity $\eta_{sp}$ was measured in the same manner as above. This dilution procedure by addition of 5 ml decalin solvent was repeated twice. As shown in the following formula (Eq-1), the $\eta_{sp}$/C value obtained by extrapolating the concentration (C) to zero was defined as the intrinsic viscosity [η] (unit: dl/g):

$$[\eta]=\lim(\eta_{sp}/C)(C\rightarrow 0) \qquad \text{(Eq-1)}.$$

<Methods for Evaluating Toner>

(1) Low-Temperature Fixability

An unfixed image was formed using a copying machine obtained by remodeling a commercially available electrophotographic copying machine. Thereafter, using a heating roller fixing apparatus obtained by remodeling a fixing section of a commercially available copying machine, the unfixed image was fixed by a heating roller at a fixing rate of 190 mm/sec and a temperature of 130° C. The resultant fixed image was rubbed 6 times with an ink eraser (manufactured by Tombow Pencil Co., Ltd.) under a load of 1.0 kgf. The image density, before and after the rubbing test, was measured using a Macbeth reflection densitometer. A value calculated by the following formula was defined as a ratio of change at the temperature: image density after rubbing/image density before rubbing×100. A calculated mean value of the ratio of change at 130° C. was defined as a fixation ratio. The heating roller fixing apparatus used herein had no silicone oil feed mechanism. The environmental conditions were normal temperature and normal pressure (temperature: 22° C., relative humidity: 55%).

(Evaluation Criteria)

A: 42%≤fixing ratio
B: 39%≤fixing ratio<42%
C: 35%≤fixing ratio<39%
D: fixing ratio<35%

(2) Low-Temperature Offset Property

An unfixed image was formed using the above copying machine and, then, the toner image was transferred and fixed using the above heating roller fixing apparatus. Next, the occurrence or non-occurrence of toner staining on the non-image portion was observed. The above procedure was repeated while successively lowering the preset temperature of the heating roller of the heating roller fixing apparatus, starting from 150° C. A preset temperature where toner staining occurred was defined as an offset occurrence temperature, and the offset occurrence temperature at the low temperature side was used as a low-temperature offset property. The atmosphere of the copying machine was set to a temperature of 22° C. and a relative humidity of 55%.

(Evaluation Criteria)

A: offset occurrence temperature<130° C.
B: 130° C.≤offset occurrence temperature<135° C.
C: 135° C.≤offset occurrence temperature<140° C.
D: 140° C.≤offset occurrence temperature (3) High-Temperature Offset Property An unfixed image was formed by the above copying machine and, then, the toner image was transferred and fixed using the above heating roller fixing apparatus. Next, the occurrence or non-occurrence of toner staining on the non-image portion was observed. The above procedure was repeated while successively elevating the preset temperature of the heating roller of the heating roller fixing apparatus, starting from 190° C. A preset temperature where toner staining occurred was defined as an offset occurrence temperature. The atmosphere of the copying machine was set to a temperature of 22° C. and a relative humidity of 55%.

(Evaluation Criteria)

A: 220° C.≤offset occurrence temperature
B: 210° C.≤offset occurrence temperature<220° C.
C: 200° C.≤offset occurrence temperature<210° C.
D: offset occurrence temperature≤200° C.

(4) Storage Property 5 g of a toner was placed under environmental conditions in which a temperature is 50° C. and a relative humidity is 60% for 24 hours, and the resultant toner was placed on a 150 mesh sieve. Then, using a powder tester (Hosokawa Powder Engineering Research Institute) with a rheostat adjusted to a scale of 3, the sieve was vibrated for one minute. After the vibration, the mass of the toner remaining on the 150 mesh sieve was measured to determine a residual mass ratio.

(Evaluation Criteria)

A: residual mass ratio<45%

B: 45%≤residual mass ratio<65%

C: 65%≤residual mass ratio<75%

D: 75%≤residual mass ratio

<Method for Evaluating Hot Melt Adhesive Composition>

(1) Melt Viscosity (Ordinary Usage Temperature)

The melt viscosity at 180° C. was measured using Brookfield viscometer. 10 g of a sample was loaded to the viscometer heated to 180° C., and measurement was started after melting the sample for 10 minutes. No. 31 rotor was used at 5 rotations per minute, and after 20 minutes, the viscosity (mPa·s) was taken.

(Evaluation Criteria)

B: less than 3,000 mPa·s

C: 3,000 to 4,000 mPa·s

D: more than 4,000 mPa·s (2) Heat-Resistant Adhesion (Method for Preparing Adhesion Test Specimen)

Using a hot melt open time tester (manufactured by Asahi Chemical Synthetic Co., LTD), a hot melt adhesive composition was adhered to an adherend under conditions such that a coating temperature is 180° C., a coating amount is 0.03 g/cm$^2$, a coating speed is 7.5 m/min, an open time is 2 seconds, and a press load is 2 kg. (Size: 50 mm×100 mm)

(Adherend for Adhesion Test)

A general-purpose corrugated fiberboard (K" liner) was used as the adherend.

(Method for Measuring Heat-Resistant Adhesion (Peeling Adhesive Failure Time)

The test specimen prepared by the above method for preparing an adhesion test specimen was cut into 25 mm×100 mm size to prepare a substrate for use in a T-peel test. A load of 300 g/25 mm was hung from the substrate and placed in an oven set at a temperature of 65° C. The time taken for the occurrence of adhesion failure (weight fall) due to incapability of withstanding the load was defined as the peeling adhesive failure time.

(Evaluation Criteria)

B: 80 minutes or more

D: less than 80 minutes (3) Curing Speed

A hot melt adhesive composition was put into a 100 ml test tube (2.5 cm diameter), and heated by a heater set at 180° C. The hot melt adhesive composition was allowed to stand for 10 minutes, and the molten content was stirred finely with a slim spatula for one minute. Then, a thermometer was inserted into the composition, and the composition was heated until the internal temperature reached 170° C. Subsequently, the test tube was quickly removed for cooling. During the cooling process, the composition at the bottom of the test tube became clouded, and the temperature at the instance of clouding was read. During the cooling, the test tube was fixed at a position which is 1 cm apart from the bottom of a beaker so as to avoid local cooling by an air current.

(Evaluation Criteria)

Temperature at the occurrence of clouding

B: 118° C. or more

D: 118° C. or less

PREPARATION EXAMPLES OF TONER BINDERS

Preparation Example of Low-Molecular Weight Vinyl Resin (L-1)

Preparation Example L-1

Into a flask purged with nitrogen was charged 100 parts by mass of mixed xylene, followed by heating. Under reflux of xylene, a mixed solution obtained by mixing and dissolving 10 parts by mass of t-butyl peroxy-2-ethylhexanoate in 93 parts by mass of styrene, 6 parts by mass of n-butyl acrylate and 1 part by mass of methacrylic acid was continuously added to the flask over 5 hours, and refluxing was continued for additional 1 hour. Thereafter, the internal temperature was maintained at 98° C., and 0.5 parts by mass of t-butyl peroxy-2-ethylhexanoate was further added, thereby continuing the reaction for another 1 hour. Subsequently, 0.5 parts by mass of t-butyl peroxy-2-ethylhexanoate was further added, thereby continuing the reaction for another 2 hours to obtain a polymer solution of a low-molecular weight vinyl resin L-1 having a peak molecular weight of 4,600 and an acid value of 6.5 mgKOH/g.

Preparation Example of High-Molecular Weight Vinyl Resin (H-1)

Preparation Example H-1

Into a flask purged with nitrogen was charged 74 parts by mass of styrene, 23.5 parts by mass of n-butyl acrylate and 2.5 parts by mass of methacrylic acid, followed by heating to an internal temperature of 120° C. While maintaining the internal temperature, bulk polymerization was carried out for 8 hours. Subsequently, 50 parts by mass of mixed xylene were added, followed by addition of 0.2 parts by mass of tetraethylene glycol diacrylate, and the temperature was elevated to 110° C. A mixed solution of 0.35 parts by mass of 1,1-bis(t-butylperoxy)cyclohexane and 60 parts by mass of mixed xylene prepared in advance was continuously added over 9 hours while maintaining the temperature at 110° C., thereby continuing the reaction for 1 hour. Then, 0.21 parts by mass of 1,1-bis(t-butylperoxy)cyclohexane was added, and the reaction was continued for 2 hours. Furthermore, 0.52 parts by mass of 1,1-bis(t-butylperoxy) cyclohexane was added, and the reaction was continued for 2 hours to complete the polymerization and obtain a polymer solution of a high-molecular weight vinyl resin H-1 having a peak molecular weight of 300,000 and an acid value of 16.3 mgKOH/g.

Preparation Example of Binder Resin (C-1)

Preparation Example C-1

The above obtained polymer solutions were mixed together in amounts such that the resultant mixture contains 50 parts by mass of the high-molecular weight vinyl resin (H-1) and 50 parts by mass of the low-molecular weight vinyl resin (L-1). The resultant mixture was subjected to flash distillation in a vessel (container) at 190° C. and 1.33 kPa to remove the solvent and the like, thereby obtaining a binder resin C-1 having a first peak at a molecular weight of 4600, a second peak at a molecular weight of 300,000 and an acid value of 11.4 mgKOH/g.

Synthesis Examples of Polyethylene Waxes

Synthesis Example 1

Into a fully nitrogen purged continuous polymerization apparatus (volume: 33 L) equipped with stirring blades were charged, from a feed port thereof, 24 L/hour of dehydrated and purified n-hexane, 1.0 mmol/hour of triisobutylaluminum, 0.03 mmol/hour of N,N-dimethylanilinium tetrakis (pentafluorophenyl)borate and 0.01 mmol/hour of bis(n-butylcyclopentadienyl)zirconium dimethyl. From another feed port of the polymerization apparatus were charged 5.5 kg/hour of ethylene and 480 NL/hour of hydrogen, thereby performing a continuous solution polymerization at a polymerization temperature of 150° C. and under total pressure of 3.0 to 3.2 MPaG under conditions such that the residence time is 50 minutes.

The thus produced oligomer solution in the polymerization apparatus was continuously discharged therefrom and flowed into a flash tank for removing unreacted ethylene and n-hexane by evaporation. The resultant solution was subjected to thin-film distillation at a processing rate of 6 g/min at 210° C. under reduced pressure (43 Pa). Polyethylene wax (A-1) was obtained by repeating the above procedures until the obtainment of a required amount. The results of physical property measurements are shown in Table 1.

Synthesis Example 2

Polyethylene wax (A-2) was obtained in substantially the same manner as in Synthesis Example 1 except that the wax was not subjected to distillation purification. The results of physical property measurements are shown in Table 1.

Preparation Examples of Toners and Results of Evaluation

Example 1

To 100 parts by mass of the binder resin C-1 were added 6 parts by mass of carbon black (MA100, manufactured by Mitsubishi Kasei Corporation), 5 parts by mass of the polyethylene wax (A-1) obtained in Synthesis Example 1 and 0.5 parts by mass of a charge controlling agent (T-77, manufactured by Hodogaya Chemical Co., Ltd.) and mixed by a Henschel mixer. The thus obtained mixture was kneaded by a twin-screw kneader (PCM-30 type, manufactured by Ikegai Kikai Co., Ltd.) at a resin temperature (measured at a twin-screw kneader discharge section) of 120° C. for a residence time of 30 seconds. Subsequently, the resultant was cooled, pulverized and classified to obtain a toner. The results of evaluation of the obtained toner are shown in Table 2.

Comparative Example 1

A toner was obtained in substantially the same manner as in Example 1 except that the polyethylene wax (A-2) obtained in Synthesis Example 2 was used instead of the polyethylene wax (A-1) used in Example 1. The results of evaluation of the obtained toner are shown in Table 2.

Comparative Example 2

A toner was obtained in substantially the same manner as in Example 1 except that Hi-WAX 200P (trade name, manufactured by Mitsui Chemicals, Inc.; ethylene: 100.0 mol %, physical properties are shown in Table 1) was used instead of the polyethylene wax (A-1) used in Example 1. The results of evaluation of the obtained toner are shown in Table 2.

Comparative Example 3

A toner was obtained in substantially the same manner as in Example 1 except that Hi-WAX 220P (trade name, manufactured by Mitsui Chemicals, Inc.; ethylene-propylene copolymer, propylene derived constituent unit: 5.1 mol %, physical properties are shown in Table 1) was used instead of the polyethylene wax (A-1) used in Example 1. The results of evaluation of the obtained toner are shown in Table 2.

TABLE 1

| | Wax | | Synthesis Example 1 A-1 | Synthesis Example 2 A-2 | 200P | 220P |
|---|---|---|---|---|---|---|
| Constituent Unit | Ethylene | mol % | 100.0 | 100.0 | 100.0 | 94.9 |
| | Propylene | mol % | 0 | 0 | 0 | 5.1 |
| Properties of Wax | Mw | — | 660 | 450 | 2,720 | 2,950 |
| | Mw/Mn | — | 1.37 | 1.73 | 2.54 | 2.54 |
| | Penetration Index | — | 2 | 21 | 1 | 13 |
| | Melting Point | ° C. | 71 | 46 | 123 | 108 |
| | Fraction of $\Delta H_{-50}$ | % | 2.8 | 32.4 | 0.0 | 5.9 |
| | Number of Endothermic Peaks | — | 3 | 3 | 1 | 2 |
| | Melt Viscosity at 140° C. (K) | mP·s | 7 | 2 | 80 | 91 |
| | 0.15 × K | — | 1.1 | 0.3 | 12.0 | 13.7 |
| | Content of Components having Mw of 5,000 or more (B) | wt % | 0.0 | 0.0 | 14.2 | 21.1 |
| | Intrinsic Viscosity [η] | dl/g | 0.04 | 0.03 | 0.13 | 0.13 |

TABLE 2

|  |  | Ex. 1 | Comp. Ex. 1 | Comp. Ex. 2 | Comp. Ex. 3 |
|---|---|---|---|---|---|
| Wax |  | A-1 | A-2 | 200P | 220P |
| Evaluation of Toner | Low-temperature Fixability | B | A | D | C |
|  | Low-temperature Offset Property | A | A | D | C |
|  | High-temperature Offset Property | B | C | A | B |
|  | Storage Property | B | D | A | C |

Preparation Examples of Hot Melt Adhesive Compositions and Results of Evaluation Example 2

A hot melt composition was obtained by blending 40 parts by mass of an ethylene-vinyl acetate copolymer (Evaflex (Registered Trademark) EV220, manufactured by Du Pont-Mitsui Polychemicals Co., LTD) as a resin (B), 40 parts by mass of an aromatic hydrocarbon resin (FTR (Registered Trademark) 6125, manufactured by Mitsui Chemicals, Inc.) as a tackifier, and 20 parts by mass of the polyethylene wax (A-1) obtained in Synthesis Example 1, and kneading the resultant mixture for 15 minutes using an autoclave at 180° C. The results of evaluation of the obtained hot melt adhesive composition are shown in Table 3.

Comparative Example 4

A hot melt composition was obtained in substantially the same manner as in Example 2 except that the polyethylene wax (A-2) obtained in Synthesis Example 2 was used instead of the polyethylene wax (A-1) used in Example 2. The results of evaluation of the obtained hot melt adhesive composition are shown in Table 3.

Comparative Example 5

A hot melt composition was obtained in substantially the same manner as in Example 2 except that Hi-WAX 200P (trade name, manufactured by Mitsui Chemicals, Inc.; ethylene: 100.0 mol %, properties are shown in Table 1) was used instead of the polyethylene wax (A-1) used in Example 2. The results of evaluation of the obtained hot melt adhesive composition are shown in Table 3.

TABLE 3

|  |  |  | Ex. 2 | Comp. Ex. 4 | Comp. Ex. 5 |
|---|---|---|---|---|---|
| Content | Ethylene Copolymer | parts by mass | 40 | 40 | 40 |
|  | Tackifier | parts by mass | 40 | 40 | 40 |
|  | Wax: A-1 | parts by mass | 20 |  |  |
|  | Wax: A-2 | parts by mass |  | 20 |  |
|  | Hi-WAX 200P | parts by mass |  |  | 20 |
| Evaluation of Hot Melt | Melt Viscosity (180° C.) |  | B | B | D |
| Adhesive Composition | Heat-Resistant Adhesion (65° C.) |  | B | D | B |
|  | Curing Speed |  | B | D | B |

This application is a U.S. national stage application of International Patent Application No. PCT/JP2015/002129, filed on Apr. 17, 2015, which claims priority based on Japanese Patent Application No. 2014-086656, filed on Apr. 18, 2014, the entire contents of which including the specification and the claims are incorporated herein by reference.

The invention claimed is:

1. A resin composition comprising:
a polyethylene wax (A) which satisfies requirements (i) to (v) below:
(i) a weight average molecular weight (Mw) of 400 to 1,500 as measured by GPC,
(ii) a molecular weight distribution (Mw/Mn) of 1.2 to 2.5 as measured by GPC,
(iii) a penetration index of 5 dmm or less as measured in accordance with JIS K 2207 at 25° C.,
(iv) a melting point (Tm) of 50 to 110° C. as measured by differential scanning calorimetry (DSC), and
(v) a fraction of a heat of fusion ($\Delta H_{-50}$) derived from a peak at 50° C. or lower, relative to total heat of fusion ($\Delta H_{all}$) derived from all peaks, being 1.0% to 5.0% as measured by differential scanning calorimetry (DSC); and
at least one resin (B) selected from the group consisting of a thermoplastic resin and a thermosetting resin,
wherein a mass ratio of (A) to (B) ((A)/(B)) is 0.1/99.9 to 50/50.

2. The resin composition according to claim 1, wherein the polyethylene wax (A) further satisfies requirement (vi) below:
(vi) a number of melting peaks of 2 or more as measured by differential scanning calorimetry (DSC).

3. The resin composition according to claim 1, wherein the polyethylene wax (A) further satisfies requirement (vii) below:

$$B \leq 0.15 \times K \qquad \text{(vii)}$$

where B is a content (mass %) of components having a molecular weight of 5,000 or more in the polyethylene wax (A), the molecular weight being in terms of polyethylene as measured by gel permeation chromatography, and K is a melt viscosity (mPa·s) of the polyethylene wax (A) at 140° C.

4. The resin composition according to claim 1, wherein the resin (B) is a thermoplastic resin.

5. The resin composition according to claim 1, wherein the resin (B) is at least one resin selected from the group consisting of a polyester resin and a styrene-based polymer.

6. An electrophotographic toner containing the resin composition according to claim 1, and a colorant.

7. A hot melt composition containing 100 parts by mass of the resin composition according to claim 1, and 5 to 300 parts by mass of a tackifier.

* * * * *